No. 724,520. PATENTED APR. 7, 1903.
J. M. TAYLOR.
COUNTERSINK.
APPLICATION FILED NOV. 7, 1901.
NO MODEL.
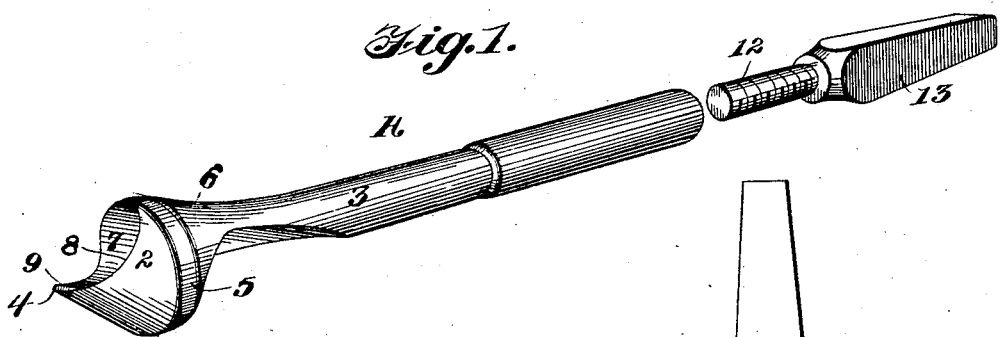
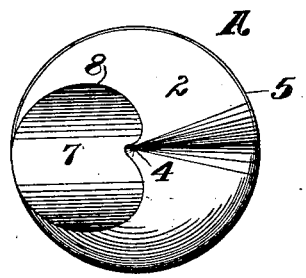
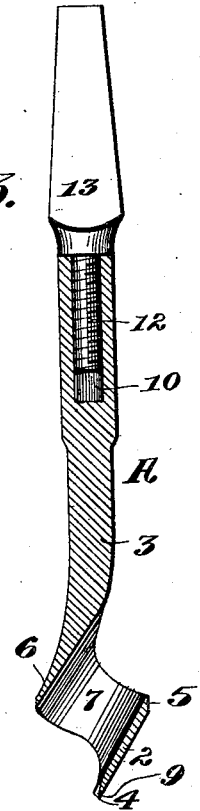
Witnesses:
N. G. Campbell
E. M. Wilcox
Inventor:
John M. Taylor:
By his Attorney.
F. H. Richards

UNITED STATES PATENT OFFICE.

JOHN M. TAYLOR, OF HARTFORD, CONNECTICUT.

COUNTERSINK.

SPECIFICATION forming part of Letters Patent No. 724,520, dated April 7, 1903.

Application filed November 7, 1901. Serial No. 81,377. (No model.)

*To all whom it may concern:*

Be it known that I, JOHN M. TAYLOR, a citizen of the United States, residing in Hartford, in the county of Hartford and State of Connecticut, have invented certain new and useful Improvements in Countersinks, of which the following is a specification.

This invention relates to that class of tools designated as "countersinks," the object of the invention being to provide an improved tool of this description effective to make a shear cut.

A further object of the invention is to provide an improved countersink which will effectively cut the wood and in so doing leave the opening formed thereby in a smooth and uniform condition.

A further object of the invention is to provide an improved countersink the shank of which is formed as a two-part member, whereby the tool may be used as a bit in a chuck or brace.

In the drawings accompanying and forming part of this specification, Figure 1 is a perspective view of this improved countersink, one part of the shank being detached. Fig. 2 is an end view thereof, and Fig. 3 is a partly sectional view of the countersink.

Similar characters of reference designate corresponding parts in the different figures of the drawings.

This improved countersink comprises in a general way a head or head portion and a shank, such head having an opening extending therethrough from one side of the axis of the tool adjacent to the cutting-lip to a point in the rear of such head and at the opposite side of such axis, forming a clearance or passage for the chips, one of the edges of the wall of said opening constituting a cutting-lip effective to make a shear cut.

In the form thereof herein shown and described the countersink (designated in a general way by A) comprises a conical head 2 and a shank 3, the apex of said head forming an entering or cutting point 4 and the base thereof terminating in a band portion 5, substantially parallel to the axis of the shank and which acts as a guide during the boring of the work. This band portion converges into the shank 3 and is in the form of a truncated cone 6, such head thus comprising in the form shown what may be considered a duplex cone. Formed in the head at an angle to the axis of the shank is an opening 7, constituting a clearance or passage for the chips. This opening intersects the axis of the tool and is therefore located at an angle to such axis and leads from the cutting-lip to the rear or opposite side of the head, intersecting the axis thereof, to permit the chips to pass entirely away from the work and is preferably tapered toward the shank, thereby to facilitate the passage of the chips during the rapid working of the tool. One of the outer edges of the wall of the opening forms a cutting-lip 8, which is of spiral formation, whereby it is effective to make a shear cut, and terminates in a shoulder 9, forming an entering or cutting point 4 at the apex of the conical head 2. The head may be formed from a suitable blank by bending or shaping such blank to form the head with its edge forming the cutting-lip, or such head may have the opening drilled therein, as in the present instance, or otherwise formed. In the form shown the shank 3 is formed as a two-part one, one part having a threaded bore and the other a threaded spindle for connection therewith. In the tool shown that part of the shank formed with the head is furnished with the bore 10, the part carrying the threaded spindle 12 having a squared end 13, whereby the countersink may be used as a bit in a brace. When it is desired to use the countersink as a bit in a chuck, it is simply necessary to detach the squared end and clamp the countersink in position in such chuck.

By providing an opening extending from the front to the rear side of the conical head and at an angle to the axis of the tool, the shank and the rear cone being cut away somewhat to permit this, it will be readily seen that the chips during the boring operation will quickly and readily pass through such opening, which is of relatively large size, to the rear or opposite side of the head, and consequently away from the cutting-lip and the work, thus permitting the tool to work in an effective manner without being impeded by the chips.

By constructing the tool in the manner set forth it may be used as a bit in a brace or in a chuck. Moreover, it is effective to make a shear cut, whereby the wood may be bored evenly and uniformly without tearing the fibers thereof, so that the opening will be smooth throughout.

I claim as my invention—

1. A countersink having a cone-shaped head provided with an opening crossing diagonally to the axis within the length of the tool and intersecting the apex of the cone, said opening having a curved edge forming a cutting-lip.

2. A countersink having a cone-shaped head provided with an opening crossing diagonally to the axis within the length of the tool and intersecting the apex of the cone and having its circumferential edge forming a spiral cutting-lip with a shoulder at the rear side thereof.

3. A countersink having a cone-shaped head provided with an opening passing therethrough diagonally to the axis of the shank and within the length of the tool, the edge of said opening forming a spiral cutting-lip with a shoulder at the rear thereof terminating at the apex of said head in a point.

4. A countersink having a cone-shaped head provided with an opening crossing diagonally to the axis within the length of the tool and intersecting the apex of the cone and having a curved edge forming a cutting-lip and having a two-part separable shank constructed to permit the tool to be used either with a brace or in a chuck.

JOHN M. TAYLOR.

Witnesses:
C. A. WEED,
E. M. WILCOX.